(12) United States Patent
An et al.

(10) Patent No.: US 12,287,221 B2
(45) Date of Patent: Apr. 29, 2025

(54) VEHICLE AND CONTROL METHOD THEREOF

(71) Applicants: Hyundai Motor Company, Seoul (KR); Kia Corporation, Seoul (KR)

(72) Inventors: Rowoon An, Seoul (KR); Jae Yul Woo, Seoul (KR); Soobin Kim, Seoul (KR); Seunghyun Woo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 149 days.

(21) Appl. No.: 17/462,929

(22) Filed: Aug. 31, 2021

(65) Prior Publication Data

US 2022/0187096 A1 Jun. 16, 2022

(30) Foreign Application Priority Data

Dec. 15, 2020 (KR) .................. 10-2020-0175096

(51) Int. Cl.
| | |
|---|---|
| G06F 3/0486 | (2013.01) |
| G01C 21/36 | (2006.01) |
| G06F 3/0481 | (2022.01) |
| G06F 3/04845 | (2022.01) |
| G06F 3/0487 | (2013.01) |

(52) U.S. Cl.
CPC ..... *G01C 21/3644* (2013.01); *G01C 21/3605* (2013.01); *G01C 21/3679* (2013.01); *G06F 3/0481* (2013.01); *G06F 3/04845* (2013.01); *G06F 3/0486* (2013.01); *G06F 3/0487* (2013.01)

(58) Field of Classification Search
CPC ............ G01C 21/3644; G01C 21/3605; G01C 21/3679; G06F 3/0481; G06F 3/04845; G06F 3/0486; G06F 3/0487
See application file for complete search history.

(56) References Cited

U.S. PATENT DOCUMENTS

| | | | |
|---|---|---|---|
| 6,587,782 B1 * | 7/2003 | Nocek ................ | G01C 21/3614 701/438 |
| 7,392,194 B2 * | 6/2008 | Tanaka .................... | G10L 15/22 704/E15.04 |
| 2005/0261822 A1 * | 11/2005 | Wako .................. | G01C 21/3682 701/438 |
| 2010/0125407 A1 * | 5/2010 | Cho .................... | G01C 21/3679 701/533 |
| 2013/0326407 A1 * | 12/2013 | van Os ................... | G06T 19/00 715/810 |
| 2017/0364066 A1 * | 12/2017 | Yamada ............... | G05D 1/0212 |
| 2018/0164817 A1 * | 6/2018 | Herz .................. | G01C 21/3664 |
| 2019/0041852 A1 * | 2/2019 | Schubert ............. | G06N 3/0454 |
| 2020/0019913 A1 * | 1/2020 | Wu .................. | G06Q 10/06395 |

* cited by examiner

*Primary Examiner* — Jeanette J Parker (74) *Attorney, Agent, or Firm* — SLATER MATSIL, LLP

(57) ABSTRACT

An embodiment vehicle includes a user interface configured to guide a route to a destination and receive a user input and a controller configured to determine whether a highlight mark for a point of interest corresponding to the destination is set, control the user interface to display a pop-up message according to the determination result, receive the user input in response to the pop-up message, and set the highlight mark for the point of interest based on the user input.

18 Claims, 10 Drawing Sheets

| STAR SCORE | EVALUATION MESSAGE |
|---|---|
| ★★★★★ | Perfect |
| ★★★★☆ | Good |
| ★★★☆☆ | Needs improvement |
| ★★☆☆☆ | Bad |
| ★☆☆☆☆ | Poor |

VEHICLE AND CONTROL METHOD THEREOF

CROSS-REFERENCE TO RELATED APPLICATIONS

This application claims the benefit of Korean Patent Application No. 10-2020-0175096, filed in the Korean Intellectual Property Office on Dec. 15, 2020, which application is hereby incorporated herein by reference.

TECHNICAL FIELD

The disclosure relates to a vehicle and a control method thereof.

BACKGROUND

Existing map services guide users to destinations based on longitude and latitude. However, there are cases where there is a large error in the notation of the point of interest (POI), and the guidance is terminated near the destination or the user's movement context is not considered. Accordingly, the user still has difficulty in finding the final destination (e.g., parking lot, entrance).

Map service providers can apply various technologies such as point cloud to advance the final destination mapping technology. However, there are disadvantages in that the initial investment cost is high and the application of the technology may not be effective even in terms of periodic maintenance and repair in consideration of changes in the road environment.

SUMMARY

Embodiments of a vehicle for solving problems may include a user participation type user interface that reflects the user's intention in the existing map service and corrects the final destination, which is the POI.

In accordance with one embodiment of the disclosure, a vehicle includes a user interface configured to guide a route to a destination and receive a user input and a controller configured to determine whether a highlight mark for a point of interest corresponding to the destination is set, control the user interface to display a pop-up message according to the determination result, receive the user input in response to the pop-up message, and set the highlight mark for the point of interest based on the user input.

When the point of interest corresponding to the destination is not set, the controller may be configured to control the user interface to display a pop-up message for determining whether to set the point of interest corresponding to the destination from the user.

When the highlight mark for the point of interest is not set, the controller may be configured to control the user interface to display a pop-up message for determining whether to set the highlight mark for the point of interest.

When the highlight mark for the point of interest is set, the controller may be configured to control the user interface to display a pop-up message for determining whether to change the highlight mark for the point of interest.

The controller may be configured to receive a user input for setting a size of the highlight mark.

When the vehicle arrives at the destination, the controller may be configured to control the user interface to display a pop-up message for performing evaluation of the point of interest corresponding to the destination.

The controller may be configured to determine whether to change the highlight mark for the point of interest based on the evaluation result.

The user input may include at least one input of a touch, a drag, and a drop.

When the user touches the highlight mark for the point of interest corresponding to the destination, drags it while maintaining the touch, and drops it to a position corresponding to a first icon indicating a parking lot, the controller may be configured to set the highlight mark to the parking lot of the destination.

When the user touches the highlight mark for the point of interest corresponding to the destination, drags it while maintaining the touch, and drops it to a position corresponding to a second icon indicating a pedestrian entrance, the controller may be configured to set the highlight mark to the pedestrian entrance of the destination.

In accordance with one embodiment of the disclosure, a control method of a vehicle includes determining whether a highlight mark for a point of interest corresponding to a destination is set, displaying a pop-up message on a user interface according to the determination result, receiving a user input in response to the pop-up message, and setting the highlight mark for the point of interest based on the user input.

The control method may further include, when the point of interest corresponding to the destination is not set, displaying a pop-up message for determining whether to set the point of interest corresponding to the destination from the user.

The control method may further include, when the highlight mark for the point of interest is not set, displaying a pop-up message on the user interface for determining whether to set the highlight mark for the point of interest.

The control method may further include, when the highlight mark for the point of interest is set, displaying a pop-up message on the user interface for determining whether to change the highlight mark for the point of interest.

The control method may further include receiving a user input for setting a size of the highlight mark.

The control method may further include, when the user arrives at the destination, displaying a pop-up message on the user interface for performing evaluation of the point of interest corresponding to the destination.

The control method may further include determining whether to change the highlight mark for the point of interest based on the evaluation result.

The user input may include at least one input of a touch, a drag, and a drop.

The control method may further include, when the user touches the highlight mark for the point of interest corresponding to the destination, drags it while maintaining the touch, and drops it to a position corresponding to a first icon indicating a parking lot, setting the highlight mark to the parking lot of the destination.

The control method may further include, when the user touches the highlight mark for the point of interest corresponding to the destination, drags it while maintaining the touch, and drops it to a position corresponding to a second icon indicating a pedestrian entrance, setting the highlight mark to the pedestrian entrance of the destination.

BRIEF DESCRIPTION OF THE DRAWINGS

These and/or other embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Like reference numerals refer to like elements throughout the specification. Not all elements of embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Throughout the specification, when a member is said to be located "on" another member, this includes not only a case in which a member is in contact with another member but also a case in which another member is present between the two members.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

Figure 1:
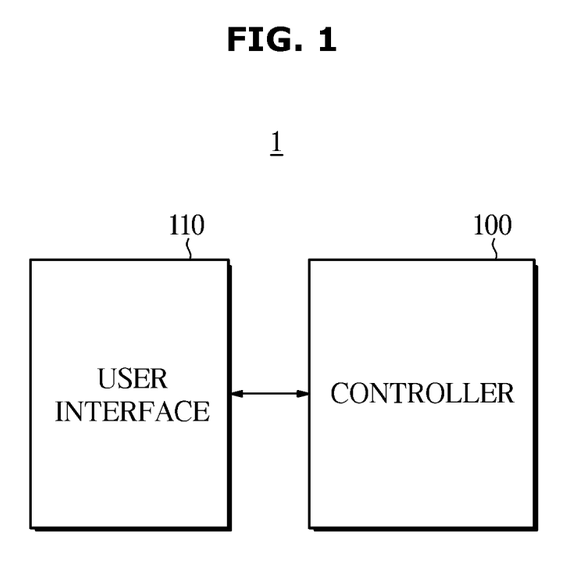
FIG. 1 is a control block diagram of a vehicle according to an embodiment of the present disclosure.

FIG. 1 is a control block diagram of a vehicle according to an embodiment of the present disclosure.

Referring to FIG. 1, a controller 100 for guiding a route to a destination using an Augmented Reality (AR) map, determining whether a highlight mark for a user interface 110 that receives a user input and for a point of interest corresponding to the destination is set, displaying a pop-up message on the user interface 110 according to the determination result, receiving the user input in response to the pop-up message, and setting the highlight mark for the point of interest based on the user input may be included.

An embodiment of the present disclosure may provide the user interface 110 that is interlocked with at least one of an AR map application and navigation.

The user interface 110 may provide a user interface to the user. The user interface 110 may receive various control commands from the user, and may transmit the received control commands to the controller 100. Also, the user interface 110 may output at least one of an image and an audio according to the operation control of the controller 100.

The user interface 110 may receive an input for a destination from a user, and may receive an input for selecting an option or menu related to a route search to the destination.

The user interface 110 may display various information provided based on a route guidance service to a destination on the screen. For example, the user interface 110 may display at least one of an AR map, current location information of a vehicle 1, destination information, and route information.

Here, the destination information may be a point of interest corresponding to a destination input by the user, and may include a highlight mark for the point of interest.

The user interface 110 may display a pop-up message for determining whether to receive a user input.

For example, if the point of interest corresponding to the destination is not set, the user interface 110 may display a pop-up message for determining whether to set a point of interest corresponding to the destination.

For example, when a highlight mark for a point of interest is not set, the user interface 110 may display a pop-up message for determining whether to set a highlight mark for the point of interest.

For example, when a highlight mark for a point of interest is set, the user interface 110 may display a pop-up message for determining whether to change the highlight mark for the point of interest.

When the vehicle 1 arrives at the point of interest corresponding to the destination, the user interface 110 may display a pop-up message for evaluating the accuracy of the point of interest or the accuracy of the highlight mark for the point of interest. Here, the evaluation of the point of interest may be an evaluation of the accuracy between the location of the destination input by the user and the location of the point of interest that is actually present, but is not limited thereto.

The user interface 110 may display a plurality of icons together for setting the highlight mark for the point of interest to any one of a parking lot of the destination or a pedestrian entrance of the destination.

For example, the plurality of icons may be a first icon and a second icon. Here, the first icon may mean a parking lot of the destination, and the second icon may mean a pedestrian entrance of the destination, but is not limited thereto.

The user interface 110 may be a touch screen.

When the user inputs a destination in navigation, the controller 100 may determine whether a point of interest corresponding to the destination is preset.

If the point of interest corresponding to the destination is not preset, the controller 100 may control the user interface 110 to display a notification message to inform the user that the point of interest is not preset.

Also, the controller 100 may control the user interface 110 to display a pop-up message for determining whether the user directly sets the point of interest corresponding to the destination.

For example, when a user input for setting a point of interest is received in response to a pop-up message, the controller 100 may set a point of interest based on the user input.

In more detail, the user input for setting the point of interest corresponding to the destination may be touching a point desired by the user on the AR map displayed on the user interface 110, and the controller 100 may set a point touched by the user as a point of interest.

If the point of interest corresponding to the destination is preset, the controller 100 may control the user interface 110 to display at least one of a point of interest and a highlight mark for the point of interest.

The controller 100 may determine whether a highlight mark for a point of interest is preset.

If the highlight mark for the point of interest is preset, the controller 100 may control the user interface 110 to display a pop-up message for determining whether the user directly changes the highlight mark for the point of interest.

For example, when a user input for changing a highlight mark for a point of interest is received in response to a pop-up message, the controller 100 may change a highlight mark based on a user input.

In more detail, the user input for changing the highlight mark may be touching a point desired by the user on the AR map displayed on the user interface 110. Also, by touching a point desired by the user on the AR map, dragging as much as the user wants while maintaining the touch, the entire inside of the area dragged by the user can be changed to the highlight mark area for the point of interest.

In addition, according to an embodiment of the present disclosure, it is described that the entire inside of the area dragged by the user is changed to the highlight mark area. However, the controller boo may change the contour line itself corresponding to the area dragged by the user into a highlight mark for the point of interest.

If the highlight mark for the point of interest is not set in advance, the controller 100 may control the user interface 110 to display a notification message for notifying the user that the highlight mark is not set in advance.

Also, the controller 100 may control the user interface 110 to display a pop-up message for determining whether the user directly adds a highlight mark for a point of interest.

For example, when a user input for adding a highlight mark for a point of interest is received in response to the pop-up message, the controller 100 may add the highlight mark based on the user input.

In more detail, the user input for adding the highlight mark may be touching a point desired by the user on the AR map displayed on the user interface 110. Also, by touching a point desired by the user on the AR map, dragging as much as the user wants while maintaining the touch, the entire inside of the area dragged by the user can be added to the highlight mark area for the point of interest.

In addition, according to an embodiment of the present disclosure, it is described that the entire inside of the area dragged by the user is added to the highlight mark area. However, the controller 100 may add the contour line itself corresponding to the area dragged by the user as a highlight mark for the point of interest.

When the vehicle 1 arrives at the point of interest corresponding to the destination, the controller 100 may control the user interface 110 to display a pop-up message for the user to directly evaluate the point of interest or the accuracy of the highlight mark for the point of interest.

For example, if user input is received in response to a pop-up message, the controller 100 may determine the evaluation result of the point of interest or the accuracy of the highlight mark for the point of interest, based on the user input.

If the evaluation result is lower than the predetermined score, the controller 100 may control the user interface 110 to display a pop-up message for the user to directly reset a point of interest corresponding to the destination desired by the user and directly reset a highlight mark for the point of interest.

The controller 100 may control the user interface 110 to display an icon related to the point of interest in order to reset the highlight mark for the point of interest.

For example, when the destination input by the user is a building, the controller 100 may control the user interface 110 to display a plurality of icons indicating a parking lot of a building or a pedestrian entrance of a building.

In more detail, when the user touches the highlight mark for the point of interest corresponding to the destination, drags it while maintaining the touch, and drops it to the position corresponding to the first icon indicating the parking lot, the controller 100 may set the destination's parking lot as a point of interest on the AR map. And the controller 100 can set the highlight mark to the parking lot of the destination on the AR map.

In more detail, when the user touches the highlight mark for the point of interest corresponding to the destination, drags it while maintaining the touch, and drops it to the position corresponding to the second icon indicating the pedestrian entrance, the controller 100 may set the pedestrian entrance as a point of interest on the AR map. And the controller 100 can set to the highlight mark to the pedestrian entrance on the AR map.

The controller 100 may determine whether the user moves to the vehicle 1 and control the user interface 110 to display the highlight mark for the point of interest as the destination's parking lot.

The controller 100 may be implemented as a memory (not shown) for storing an algorithm for controlling the operation of components in the vehicle 1 or data about a program reproducing the algorithm and a processor (not shown) that performs the above-described operation using data stored in a memory. In this case, the memory and the processor may be implemented as separate chips. Alternatively, the memory and the processor may be implemented as a single chip.

When guiding the route using the map screen to which the location information of the vehicle 1 is mapped, the storage (not shown) may store a program including a command providing a visual recognition function for the destination so that the user can clearly recognize the destination. For example, a program including a command for providing a highlight mark for a point of interest corresponding to a destination as a visual recognition function may be stored.

The storage (not shown) may correspond to a memory for storing the above-mentioned information and the below-mentioned information, and may be implemented as at least one of a non-volatile memory element such as cache, read only memory (ROM), programmable ROM (PROM), erasable programmable ROM (EPROM), electrically erasable programmable ROM (EEPROM), and flash memory, or a volatile memory element such as random access memory (RAM), or a storage medium such as a hard disk drive (HDD) or a CD-ROM, but is not limited thereto.

Figure 2A:
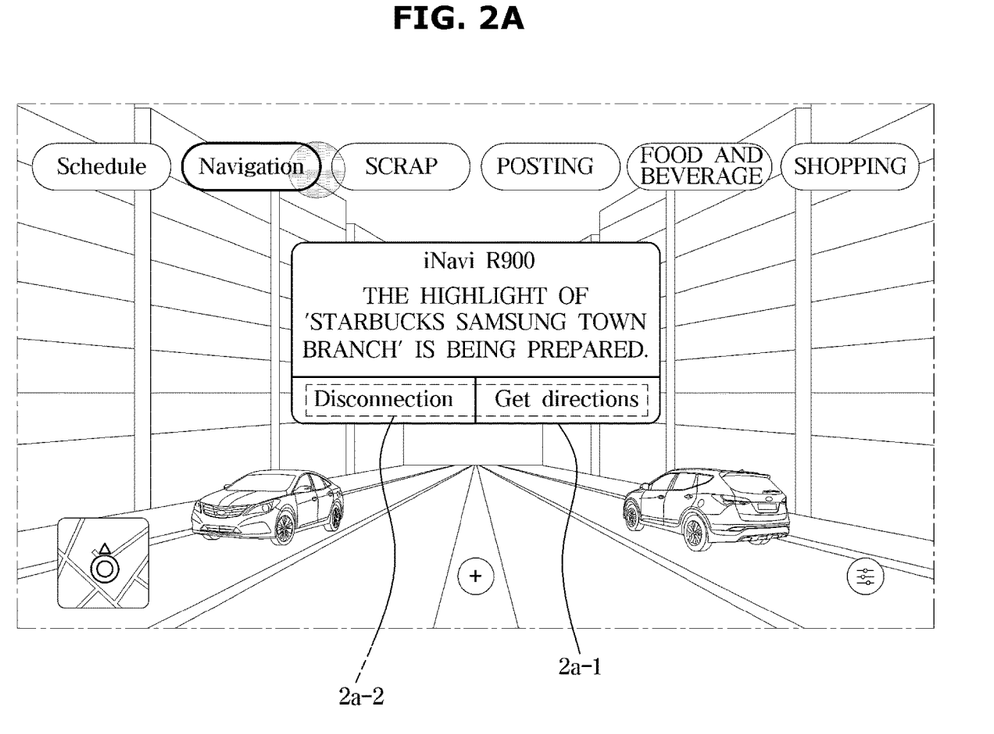
FIGS. 2A and 2B illustrate a screen for setting a highlight mark for a point of interest of a vehicle according to an embodiment of the present disclosure.
Figure 2B:
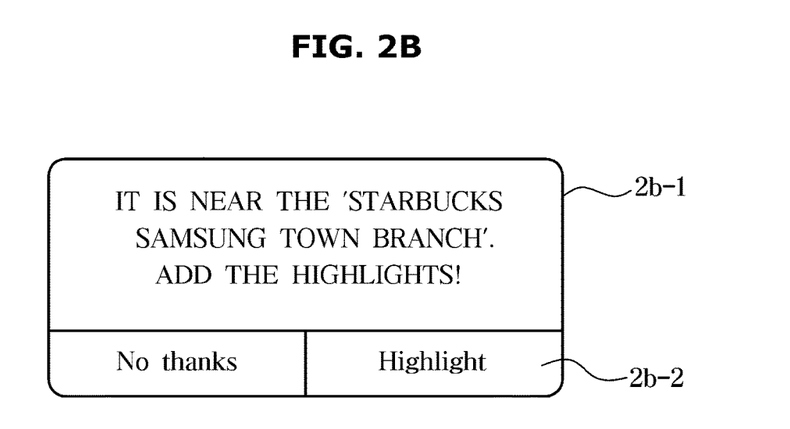

FIGS. 2A and 2B illustrate a screen for setting a highlight mark for a point of interest of a vehicle according to an embodiment of the present disclosure.

Referring to FIGS. 2A and 2B, the vehicle 1 may display an AR map when the user uses navigation.

Referring to FIG. 2A, if the destination entered by the user is "Starbucks Samsung Town Branch", the vehicle 1 may determine whether a highlight mark for a point of interest corresponding to the destination is set.

If the highlight mark for the point of interest is not set, the vehicle 1 may display a notification message 2a-1 to inform the user that the highlight mark is not set.

In addition, the vehicle 1 may also display a message 2a-2 for determining whether to continue to guide the destination route in the notification message 2a-1.

Referring to FIG. 2B, the vehicle 1 may display a pop-up message 2b-1, 2b-2 for determining whether the user directly sets a highlight mark for a point of interest.

Figure 3A:
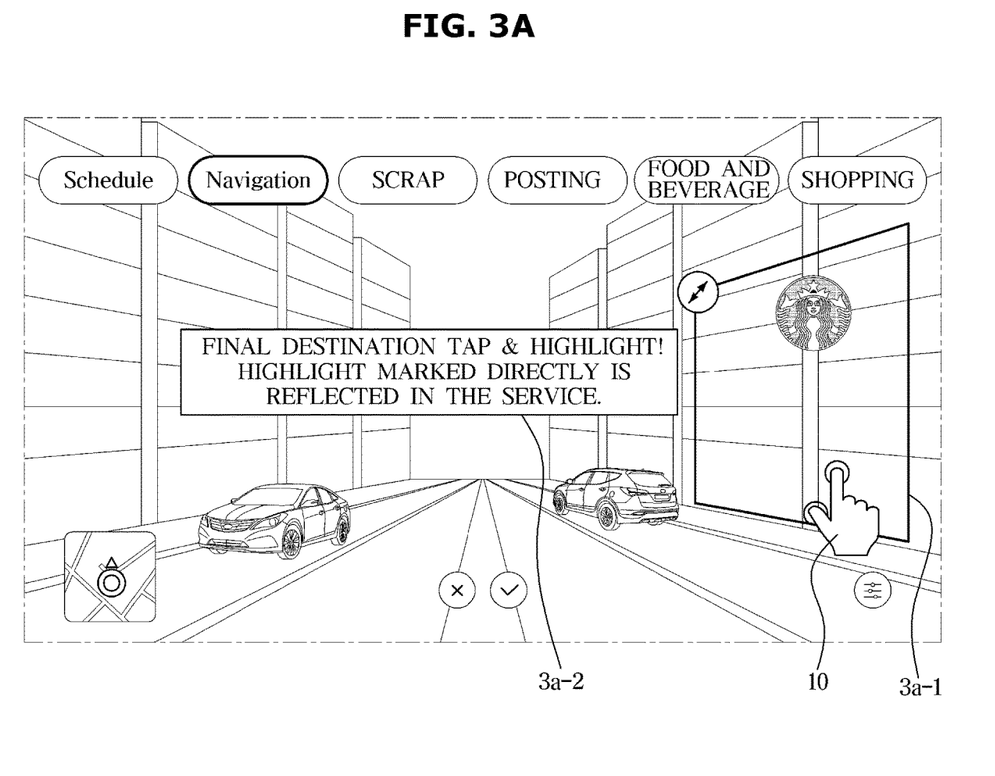
FIGS. 3A and 3B illustrate a screen for setting a size of a highlight mark for a point of interest of a vehicle according to an embodiment of the present disclosure.
Figure 3B:
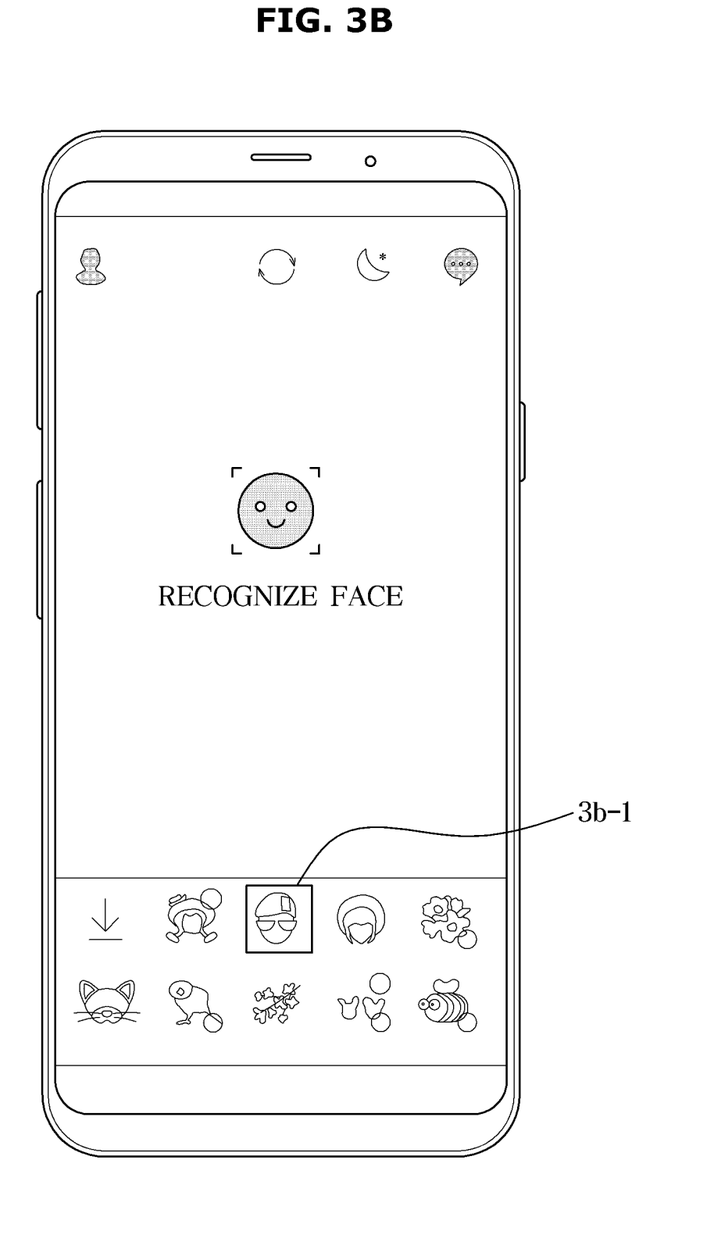

FIGS. 3A and 3B illustrate a screen for setting a size of a highlight mark for a point of interest of a vehicle according to an embodiment of the present disclosure.

Referring to FIG. 3A, in order for the user to directly set the size of the highlight mark for the point of interest, the vehicle 1 may display a contour line for the point of interest corresponding to the destination.

The vehicle 1 may set the entire area inside the contour line 3a-1 as a highlight mark area by a user 10 touching two points inside the contour line and adjusting the size of the contour line as much as a desired area.

Also, the vehicle 1 may set the contour line 3a-1 itself as a highlight mark.

An embodiment of the present disclosure displays an outline for a point of interest to set a highlight mark, and describes that the user 10 adjusts the size of the region inside the contour line. However, by touching an arbitrary desired point of the user 10 without displaying the outline line and dragging as much as a desired area, the dragged area can be changed to a highlight.

The vehicle 1 may display a notification message 3a-2 to notify the user that the size of the highlight mark has been set, and may include a message indicating that the highlight mark is reflected in the service.

Referring to FIG. 3B, an image of a point of interest familiar to the user may be provided by using the emoticon 3b-1 of the existing camera application.

Figure 4:
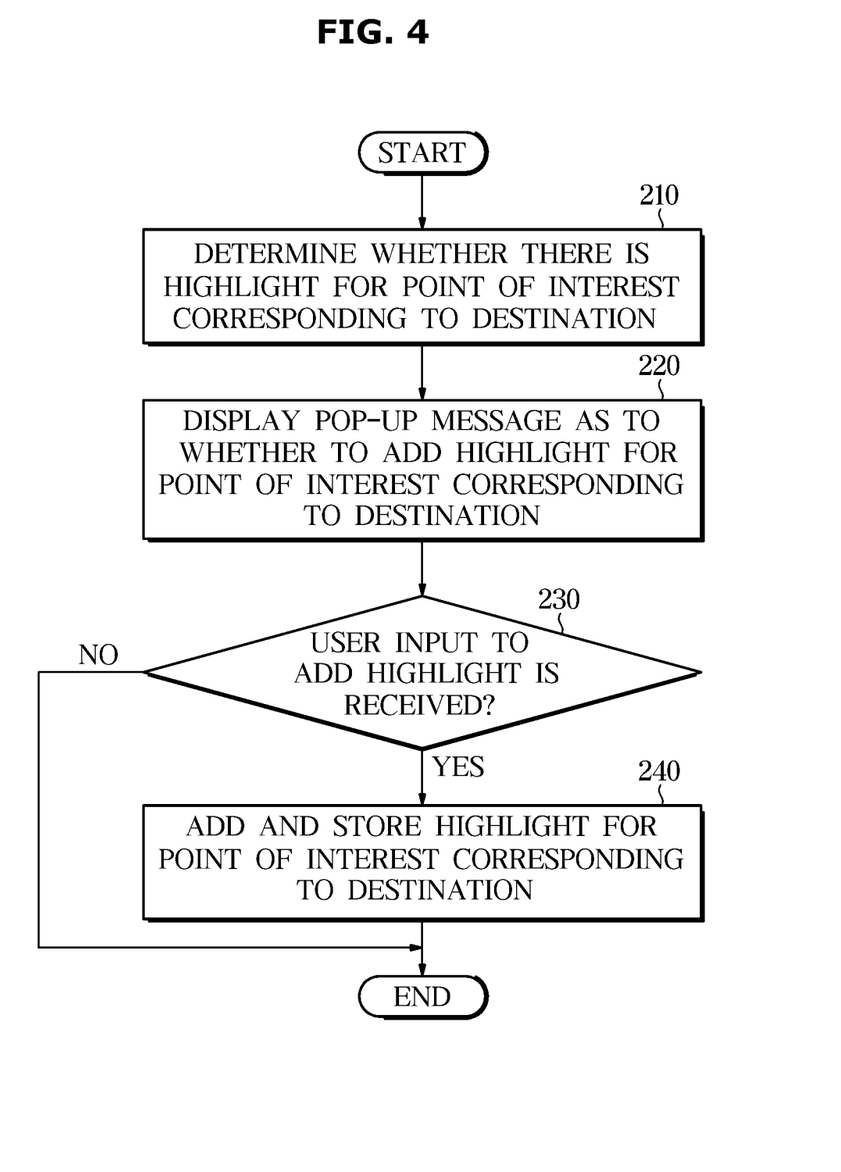
FIG. 4 is a flowchart illustrating a method for setting a highlight mark for a point of interest of a vehicle according to an embodiment of the present disclosure.

FIG. 4 is a flowchart illustrating a method for setting a highlight mark for a point of interest of a vehicle according to an embodiment of the present disclosure.

Referring to FIG. 4, the vehicle 1 may determine whether a highlight mark for a point of interest corresponding to a destination input by a user is preset (210).

If the highlight mark for the point of interest is preset, the vehicle 1 may display a pop-up message for determining whether the user directly changes the highlight mark.

For example, when a user input for changing a highlight mark for a point of interest is received in response to the pop-up message, the vehicle 1 may change the highlight mark based on the user input.

If the highlight mark for the point of interest is not set in advance, the vehicle 1 may display a pop-up message as to whether the user directly adds a highlight mark for a point of interest corresponding to the destination (220).

The vehicle 1 may determine whether it has received user input to add a highlight mark (230).

If a user input for adding a highlight mark is received, the vehicle 1 may add a highlight mark for a point of interest (240).

In more detail, the user input for adding the highlight mark may be touching a point desired by the user on the AR map displayed on the user interface 110. If the user maintains the touch of the point and drags it as much as the user wants and then drops it, the vehicle 1 can set the entire inside of the dragged area as a highlight mark area.

Also, the contour line itself corresponding to the area dragged by the user can be set as a highlight mark.

Figure 5A:
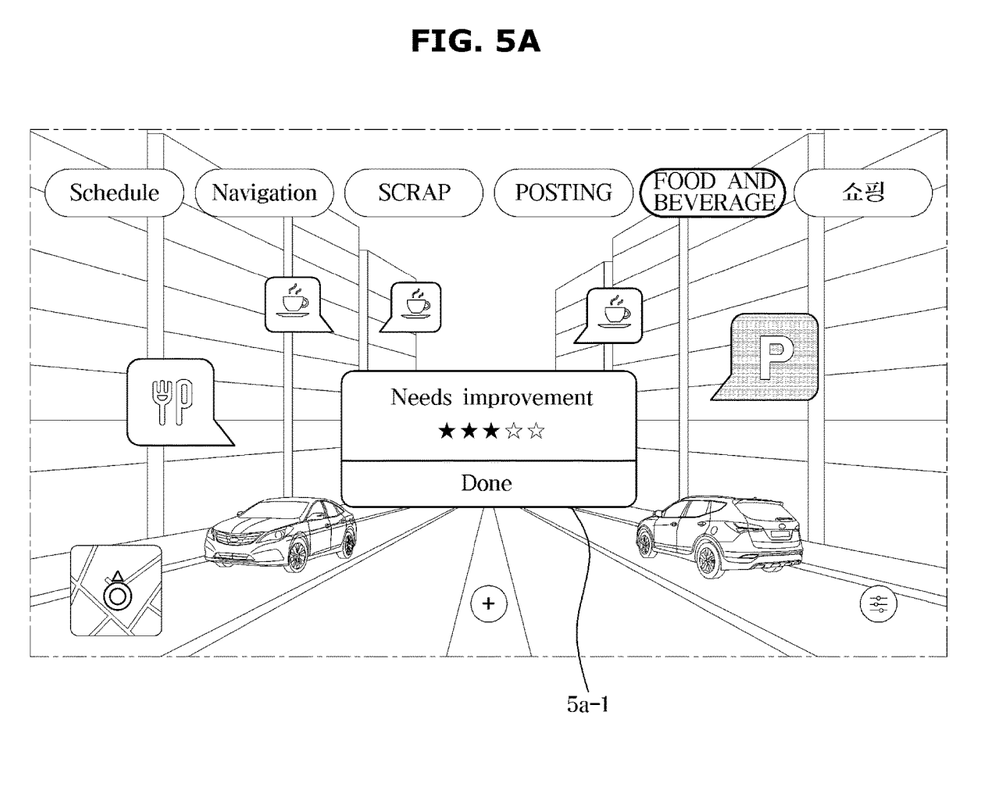
FIGS. 5A and 5B illustrate screens for evaluating the accuracy of a highlight mark for a point of interest of a vehicle according to another embodiment of the present disclosure.
Figure 5B:
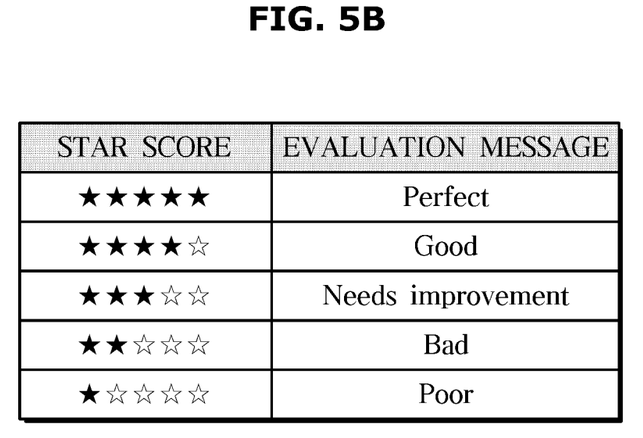

FIGS. 5A and 5B illustrate screens for evaluating the accuracy of a highlight mark for a point of interest of a vehicle according to another embodiment of the present disclosure.

Referring to FIG. 5A, the vehicle 1 may evaluate the point of interest corresponding to the destination when the route guidance is finished and the user arrives at the destination. In more detail, the vehicle 1 may display a pop-up message 5a-1 for performing the evaluation so that the user can directly participate in the evaluation.

For example, as shown in FIGS. 5A and 5B, the vehicle 1 may receive a user input for selecting the number of stars, and may perform evaluation based on the number of stars.

In more detail, if the number of stars selected by the user is 5, the vehicle 1 can evaluate it as Perfect. If the number of stars selected by the user is 4, the vehicle 1 can evaluate it as Good. If the number of stars selected by the user is 3, the vehicle 1 can evaluate it as Needs improvement. If the number of stars selected by the user is 2, the vehicle 1 can evaluate it as Bad. If the number of stars selected by the user is 1, the vehicle 1 can evaluate it as Poor.

Figure 6:
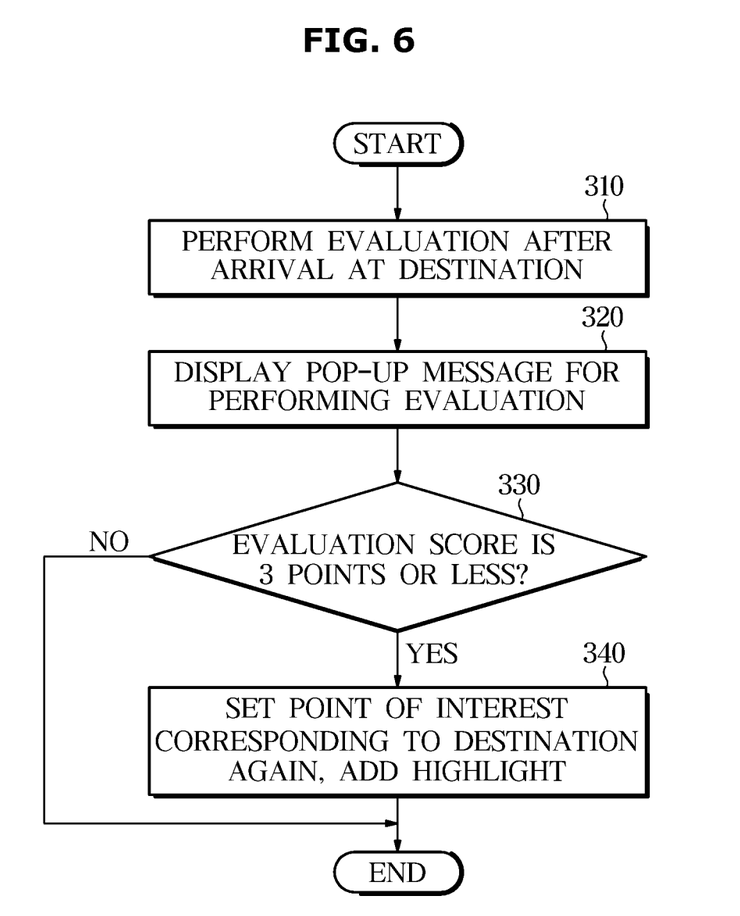
FIG. 6 is a flowchart illustrating a method for evaluating the accuracy of a highlight mark for a point of interest of a vehicle according to another embodiment of the present disclosure.

FIG. 6 is a flowchart illustrating a method for evaluating the accuracy of a highlight mark for a point of interest of a vehicle according to another embodiment of the present disclosure.

When the route guidance is finished and the user arrives at the destination, the vehicle 1 may evaluate the accuracy of the highlight mark for the point of interest (310). Here, the evaluation of the highlight mark for the point of interest may be an evaluation of the accuracy between the destination input by the user and the point of interest actually present, but is not limited thereto.

The vehicle 1 may display a pop-up message for performing evaluation (320).

The vehicle 1 may receive user input in response to the pop-up message.

Based on the user input, it may be determined whether the evaluation score is 3 points or less (330).

For example, as described above, a user input for selecting the number of stars may be received, and evaluation may be performed based on the number of stars.

If the evaluation score is 3 points or less, the vehicle 1 may set the point of interest corresponding to the destination again (340). Also, the vehicle 1 may set the highlight mark for the point of interest again (340).

Figure 7:
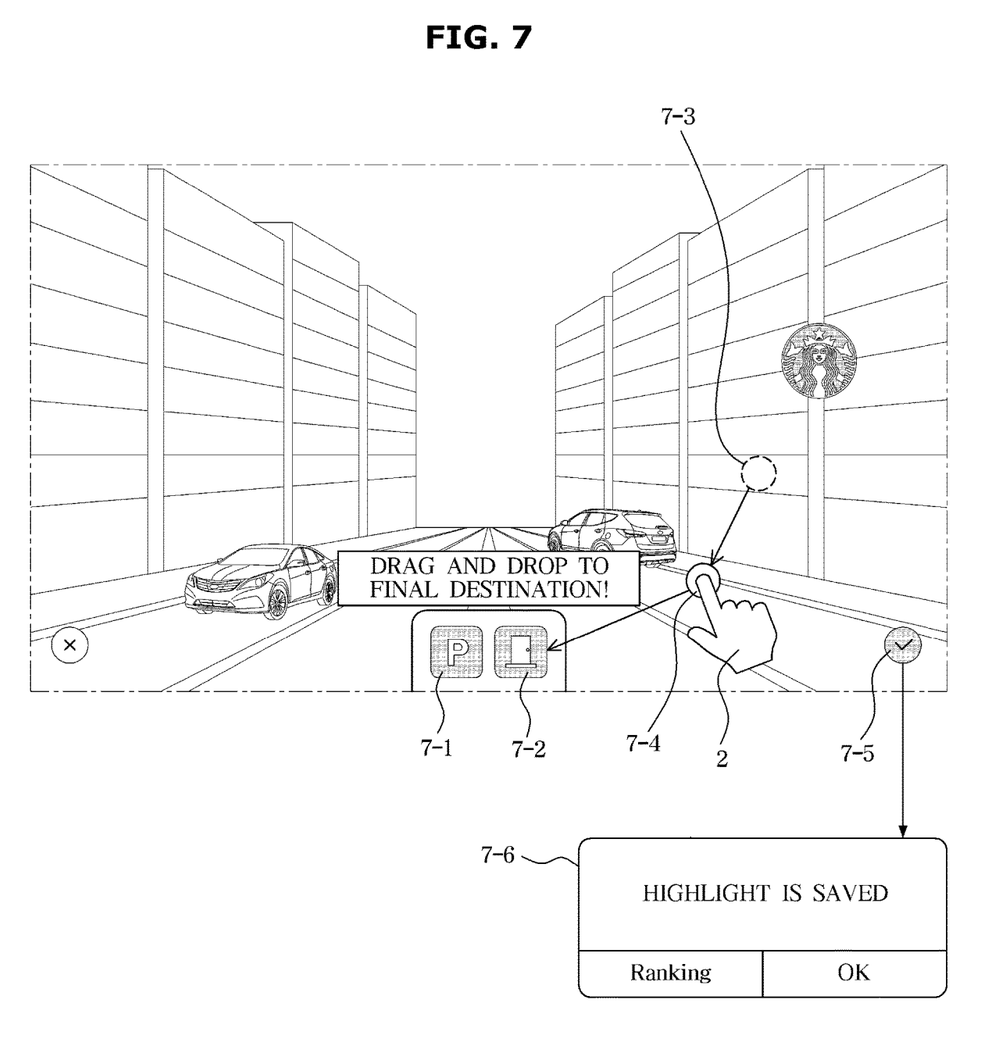
FIG. 7 illustrates a screen for setting a point of interest of a vehicle according to another embodiment of the present disclosure.

FIG. 7 illustrates a screen for setting a highlight mark for a point of interest of a vehicle according to another embodiment of the present disclosure.

Referring to FIG. 7, when the user 2 touches and drags 7-4 the highlight mark 7-3 for the point of interest, and drops it on the second icon 7-2 that means the pedestrian entrance of the destination, the vehicle 1 can set the pedestrian entrance as a point of interest. And the vehicle 1 can set to the highlight mark to the pedestrian entrance on the AR map.

If the user 2 touches and drags 7-4 the highlight mark 7-3 for the point of interest, and drops it on the first icon 7-1 that means the parking lot of the destination, and the vehicle 1 can set the parking lot as a point of interest. And the vehicle 1 can set the highlight mark to the parking lot on the AR map.

When the user 2 touches the icon 7-5, the vehicle 1 may display a notification message 7-6 indicating that the highlight mark for the point of interest has been set and stored.

Figure 8:
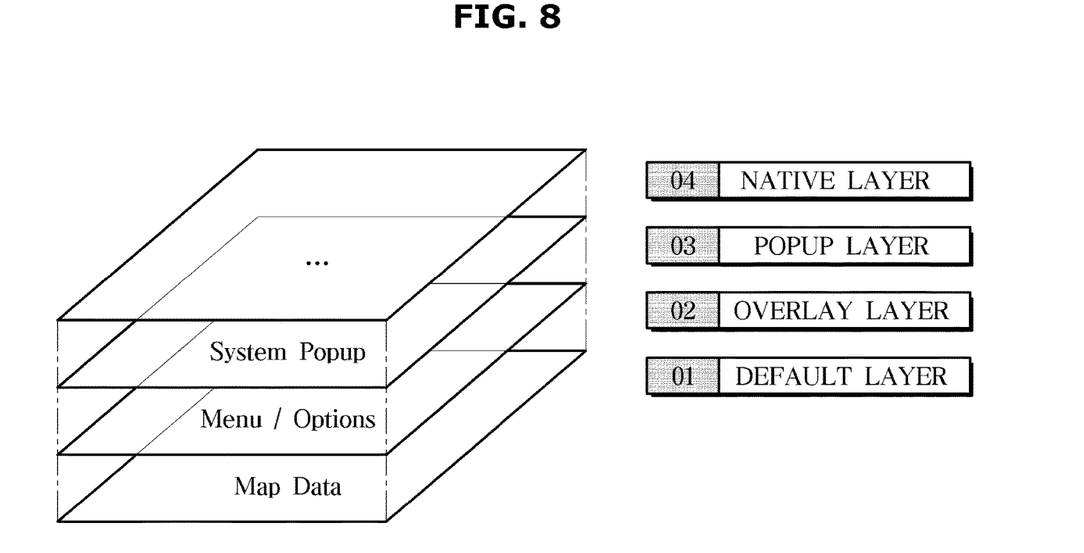
FIG. 8 illustrates a system configuration of an Augmented Reality (AR) map service of a vehicle according to an embodiment of the present disclosure.

FIG. 8 illustrates a system configuration of an Augmented Reality (AR) map service of a vehicle according to an embodiment of the present disclosure.

Information necessary for map service can be provided in four layers, and highlight mark elements for a point of interest can be provided on the overlay layer because it is on the second layer.

A pop-up message for correcting and adding a highlight mark for a point of interest and a notification message may be provided in the popup layer of the third layer.

According to an embodiment of the present disclosure, it is possible to more clearly indicate the final destination of the POI, intuitively highlight the final destination, and maintain or repair the map service according to user input through user participation.

In addition, there is an effect of reducing the time to search for a final destination, and there is an advantage in that detailed information can be provided according to a user input through a service that understands the user's movement intention.

In addition, it is possible to reduce the investment cost for Augmented Reality (AR) technology development and to reduce the maintenance and repair cost of the map service through the advancement of user participation-type POI notation.

Meanwhile, the disclosed embodiments may be implemented in the form of a recording medium that stores instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The disclosed embodiments are illustrative and should not be construed as limiting.

What is claimed is:

1. A vehicle comprising:
a user interface display configured to guide a route to a destination and receive a user input; and
a controller configured to:
determine whether a highlight mark for a point of interest corresponding to the destination is set,
control the user interface to display a first pop-up message for receiving the user input when the highlight mark is not set,
receive the user input in response to the first pop-up message, and
set the highlight mark for the point of interest in response to the receiving of the user input;
wherein, when the vehicle arrives at the destination and after the highlight mark is set, the controller is configured to control the user interface to display a second pop-up message for performing an evaluation of an accuracy of the highlight mark of the point of interest corresponding to the destination,
wherein the controller is configured to control the user interface to display a plurality of icons together, at least one of the icons of the plurality of icons is for setting the highlight mark for the point of interest to a parking lot of the destination, and at least another one of the icons of the plurality of icons is for setting the highlight mark for the point of interest to a pedestrian entrance of the destination, and
wherein the controller is configured to control the user interface to display a contour line for the point of interest corresponding to the destination in order for a user to directly set a size of the highlight mark for the point of interest.

2. The vehicle of claim 1, wherein the first pop-up message is a message for determining whether to set the point of interest corresponding to the destination from a user.

3. The vehicle of claim 1, wherein, when the highlight mark for the point of interest is set, the first pop-up message is a message for determining whether to change the highlight mark for the point of interest.

4. A vehicle comprising:
a user interface display configured to guide a route to a destination and receive a user input, wherein the user input is an input for setting a highlight mark and setting a size of the highlight mark; and
a controller configured to:
determine whether the highlight mark is set for a point of interest corresponding to the destination,
control the user interface to display a first pop-up message for receiving the user input when the highlight mark is not set,
receive the user input in response to the first pop-up message, and
set the highlight mark for the point of interest in response to the receiving of the user input;
wherein, when the vehicle arrives at the destination and after the highlight mark is set, the controller is configured to control the user interface to display a second pop-up message for performing an evaluation of an accuracy of the highlight mark of the point of interest corresponding to the destination,
wherein the controller is configured to control the user interface to display a plurality of icons together, at least one of the icons of the plurality of icons is for setting the highlight mark for the point of interest to a parking lot of the destination, and at least another one of the icons of the plurality of icons is for setting the highlight mark for the point of interest to a pedestrian entrance of the destination, and wherein the controller is configured to control the user interface to display a contour line for the point of interest corresponding to the destination in order for a user to directly set the size of the highlight mark for the point of interest.

5. The vehicle of claim 1, wherein the controller is configured to determine whether to change the highlight mark for the point of interest based on the evaluation of the accuracy performed.

6. The vehicle of claim 1, wherein the user input comprises at least one input of a touch or a drag and drop.

7. The vehicle of claim 1, wherein the controller is configured to set the highlight mark to the parking lot of the destination when a user touches the highlight mark for the point of interest corresponding to the destination, drags the highlight mark while maintaining the touch, and drops the highlight mark to a position corresponding to a first icon indicating the parking lot.

8. The vehicle of claim 1, wherein the controller is configured to set the highlight mark to the pedestrian entrance of the destination when a user touches the highlight mark for the point of interest corresponding to the destination, drags the highlight mark while maintaining the touch, and drops the highlight mark to a position corresponding to a second icon indicating the pedestrian entrance.

9. A control method of a vehicle, the control method comprising:
   determining whether a highlight mark for a point of interest corresponding to a destination is set;
   displaying a first pop-up message on a user interface according to a result of the determination;
   receiving a user input in response to the first pop-up message;
   setting the highlight mark for the point of interest based on the user input;
   after a user arrives at the destination, displaying a second pop-up message on the user interface for performing an evaluation of an accuracy of the highlight mark of the point of interest corresponding to the destination;
   displaying a plurality of icons together, wherein at least one of the icons of the plurality of icons is for setting the highlight mark for the point of interest to a parking lot of the destination, and at least another one of the icons of the plurality of icons is for setting the highlight mark for the point of interest to a pedestrian entrance of the destination; and
   displaying a contour line for the point of interest corresponding to the destination in order for the user to directly set a size of the highlight mark for the point of interest.

10. The control method of claim 9, wherein:
   the determining comprises determining that the highlight mark for the point of interest corresponding to the destination is not set; and
   the first pop-up message is a message for determining whether to set the point of interest corresponding to the destination from a user.

11. The control method of claim 9, wherein:
   the determining comprises determining that the highlight mark for the point of interest is not set; and
   the first pop-up message on the user interface is a message for determining whether to set the highlight mark for the point of interest.

12. The control method of claim 9, wherein:
   the determining comprises determining that the highlight mark for the point of interest is set; and
   the first pop-up message on the user interface is a message for determining whether to change the highlight mark for the point of interest.

13. The control method of claim 9, wherein the user input is an input for setting the size of the highlight mark.

14. The control method of claim 9, further comprising determining whether to change the highlight mark for the point of interest based on the evaluation of the accuracy performed.

15. The control method of claim 9, wherein the user input comprises a touch.

16. The control method of claim 9, wherein setting the highlight mark for the point of interest comprises setting the highlight mark to the parking lot of the destination in response to a user touching the highlight mark for the point of interest corresponding to the destination, dragging the highlight mark while maintaining the touch, and dropping the highlight mark to a position corresponding to a first icon indicating the parking lot.

17. The control method of claim 9, wherein setting the highlight mark for the point of interest comprises setting the highlight mark to the pedestrian entrance of the destination in response to a user touching the highlight mark for the point of interest corresponding to the destination, dragging the highlight mark while maintaining the touch, and dropping the highlight mark to a position corresponding to a second icon indicating the pedestrian entrance.

18. The control method of claim 9, wherein the user input comprises a drag and drop.

* * * * *